(12) United States Patent
Caffee et al.

(10) Patent No.: US 8,205,020 B2
(45) Date of Patent: Jun. 19, 2012

(54) HIGH-PERFORMANCE DIGITAL IMAGE MEMORY ALLOCATION AND CONTROL SYSTEM

(75) Inventors: Brian Richard Caffee, Farmington, NY (US); Scott Charles Warner, Ontario, NY (US); Louis Ba La, Webster, NY (US); Theresa Michelle Marconi, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 218 days.

(21) Appl. No.: 12/645,540

(22) Filed: Dec. 23, 2009

(65) Prior Publication Data

US 2011/0153876 A1  Jun. 23, 2011

(51) Int. Cl.
*G06F 13/28* (2006.01)

(52) U.S. Cl. ......................................................... 710/22

(58) Field of Classification Search ...................... 710/22
See application file for complete search history.

(56) References Cited

U.S. PATENT DOCUMENTS

| | | | |
|---|---|---|---|
| 5,251,303 A * | 10/1993 | Fogg et al. ....................... 710/24 |
| 5,579,452 A | 11/1996 | Ambalavanar et al. |
| 5,687,392 A * | 11/1997 | Radko ............................... 710/22 |
| 7,143,263 B2 * | 11/2006 | Anand et al. .................... 711/171 |
| 2009/0002761 A1 | 1/2009 | La et al. |

\* cited by examiner

*Primary Examiner* — Chun-Kuan Lee
(74) *Attorney, Agent, or Firm* — Fay Sharpe LLP

(57) ABSTRACT

Systems and methods are described that facilitate mitigating processor overload and reducing memory waste during image compression. Clients requesting memory allocation are assigned a direct memory access (DMA) channel to which DMA memory blocks are allocated for use during image compression. As each DMA block is used by its channel, the DMA block generates an interrupt message that is counted by a DMA counter and may be optionally processed by the CPU. If the number of interrupts being processed exceeds a first threshold, then memory block size is increased to reduce processor load. If the number of interrupts is below a second, lower threshold, then block size is decreased to reduce and amount of unused but allocated memory in the final block allocated to the channel a compressed image file. Fixed DMA block size may also be used and any DMA block may be programmed to generate an interrupt indicating a memory usage threshold has been crossed and that additional DMA memory blocks should be allocated to continue compression beyond the number of DMA blocks initially allocated.

10 Claims, 4 Drawing Sheets

HIGH-PERFORMANCE DIGITAL IMAGE MEMORY ALLOCATION AND CONTROL SYSTEM

BACKGROUND

The subject application relates to digital image memory allocation and control systems and methods. While the systems and methods described herein relate to digital image memory allocation and control and the like, it will be appreciated that the described techniques may find application in other memory allocation and control systems, other xerographic applications, and/or other memory allocation and control methods.

Classical multifunction xerographic products use block based electronic precollation (EPC) memory allocations for scan, mark, and middle function operations (rotation, N-up, etc). Since some form of data compression is used for most operations that store (write) image data to memory (such as scanning originals for copying), the amount of memory blocks needed for these operations is not known ahead of time. Therefore, these systems typically use controller interrupts to signal software to dynamically allocate each memory block in real time from a list of free blocks. The real-time overhead for processing these controller interrupts is considerable and especially undesirable in high performance color systems. Since many of these systems are developed with single board/single processor architectures in order to save cost, it becomes desirable to minimize processing (and memory usage) requirements while maximizing system performance and MFD speeds.

Methods have been proposed to dynamically predict storage requirements and also to eliminate most of the interrupts needed to allocate physical memory blocks for compressed images. Although using these methods can certainly greatly increase system performance, there may be some amount of extra memory assigned to each stored image that may not always be needed, since there may be some images that compress to a size substantially less than the prediction. Since in these methods there may be only one interrupt generated by compression completion it is not known how many predicted and assigned blocks actually were "consumed" by the image. A solution is needed to determine how many memory blocks actually comprise each compressed image and trim the memory block list as well as control which blocks generate interrupts for use in implementing memory thresholds for image sizes larger than predicted. This makes memory usage more efficient and is especially desirable in low cost multifunction systems where EPC memory buffers may be allocated in the single CPU memory system. In higher performance systems with separate CPU and EPC memories it may allow more pages to be stored in EPC memory.

Accordingly, there is an unmet need for systems and/or methods that facilitate determining how many memory blocks are used to compress a given image and adjusting memory block size on the fly to mitigate memory waste and reduce processor load, and the like, while overcoming the aforementioned deficiencies.

BRIEF DESCRIPTION

In accordance with various aspects described herein, systems and methods are described that facilitate reducing memory waste during image compression while mitigating processor overload. For example, a method of efficiently allocating digital image memory blocks comprises allocating a direct memory access (DMA) channel to each of one or more clients requiring memory allocation, and allocating one or more DMA blocks to each DMA channel. For each DMA channel, a DMA block list is generated that identifies DMA blocks used by each DMA channel. The method further comprises determining a number of DMA blocks used by each DMA channel, and releasing unused DMA blocks not included in any DMA block list for subsequent use.

According to another feature described herein, a system that facilitates efficient direct memory access (DMA) memory block allocation comprises a processor (CPU) programmed to execute computer-executable instructions stored to a computer-readable medium, the instructions including allocating a direct memory access (DMA) channel to each of one or more clients requiring memory allocation, allocating one or more DMA blocks to each DMA channel. The instructions further include, for each DMA channel, generating a DMA block list that identifies DMA blocks used by each DMA channel, determining a number of DMA blocks used by each DMA channel, and releasing unused DMA blocks not included in any DMA block list for subsequent use.

Yet another feature relates to a method of allocating memory blocks for image compression while mitigating processor overload, comprising assigning direct memory access (DMA) memory blocks of a predetermined size to DMA channels respectively allocated to a plurality of clients, and generating an interrupt message from each memory block as it is used by a DMA channel. The method further comprises determining whether a processor is processing a number of interrupts greater than a first predetermined threshold, and increasing the size of the memory blocks being assigned to the DMA channels to reduce the number of interrupts generated if the number of interrupts is above the first predetermined threshold. The method additionally comprises determining whether the processor is processing a number of interrupts less than a second predetermined threshold, which is lower than the first predetermined threshold, and decreasing the size of the memory blocks being assigned to the DMA channels to mitigate memory waste if the number of interrupts is below the second predetermined threshold.

DETAILED DESCRIPTION

In accordance with various features described herein, systems and methods are described that overcome the above-described problems by utilizing specialized direct memory access (DMA) controller channel hardware, DMA block counter, and associated software that together are able to determine the exact number of memory blocks assigned to a stored and compressed image. The described systems and methods can be used with any type of compression scheme, and include mechanisms for allowing any, all, or none of the DMA chaining memory blocks to generate interrupts for use in detecting memory usage thresholds. The number of blocks initially allocated can be based on any technique, including image prediction algorithms. Additional blocks that may have been allocated when an interrupt is generated by predetermined "threshold blocks" in the block chaining list are detected by the DMA hardware from a code in the chaining list command. The block counter is incremented by the DMA hardware by every consumed block and then read by software to determine the actual number of blocks used by a completed DMA chain multi-block transfer.

The described aspects are an improvement over the systems and methods described in U.S. Pat. No. 5,579,452 to Ambalavanar et al., which is hereby incorporated by reference in its entirety. That patent relates to systems and methods for allocating and managing memory blocks, but uses controller interrupts to signal block consumption. Conversely, the herein-described systems and methods employ block-generated interrupts and furthermore facilitate on-the-fly block size adjustment to reduce memory waste and interrupt load on the processor.

Figure 1:
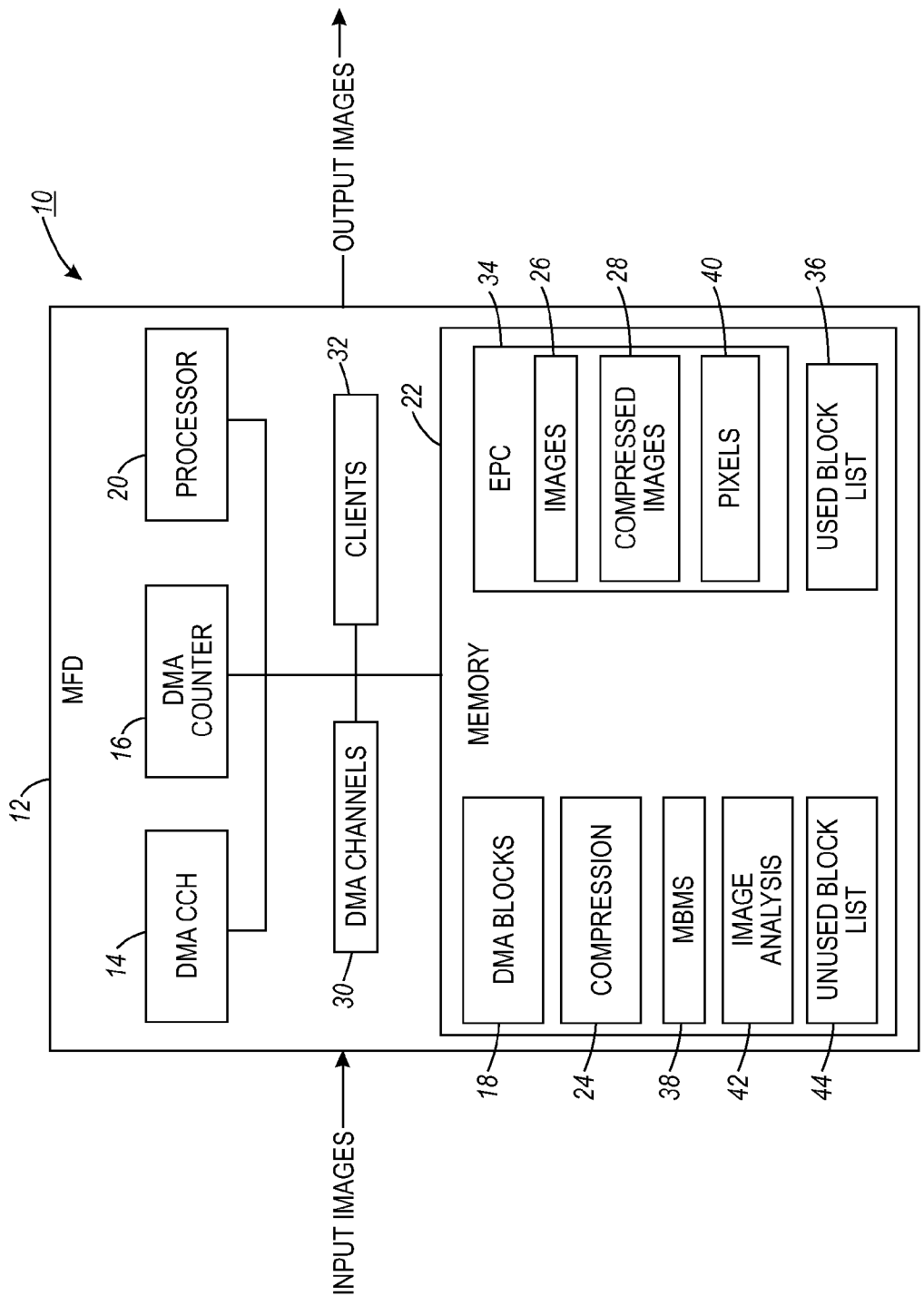
FIG. 1 illustrates a digital image memory allocation and control system, in accordance with various aspects described herein.

With reference to FIG. 1, a digital image memory allocation and control system 10 is illustrated, in accordance with various aspects described herein. The system 10 includes a multi-functional device (MFD) 12 that performs a plurality of functions, such as printing, scanning, faxing, copying, etc. The MFD includes a direct memory access (DMA) controller channel hardware (CCH) component 14 distributes DMA memory chunks 18 (e.g., 100 kb chunks or the like) and a DMA counter 16 that counts DMA chunks or blocks as they are allocated. The MFD comprises a processor 20 that executes, and a memory component 22 (e.g., a computer-readable medium) that stores, computer-executable instructions for performing the various functions, methods, etc., described herein. In addition to DMA chunks 18, the memory 22 stores one or more image compression algorithms 24, which are executed by the processor 20 to compress received image files 26 and generate compressed image files 28. It will be appreciated that the algorithms used to compress, process, transfer, and store the received image files can also be implemented using digital logic circuits such as in an ASIC device. It will also be appreciated that the processor 20 may be separate from or integral to the CCH component 14.

The system 10 provides a mechanism to enable efficient image memory usage with dynamic allocation and DMA chaining control when used with image data compression. In addition, CPU interrupts are generated and only received by the processor 20 upon completion of image data compression (and optionally by software-controlled memory threshold blocks), but are not generated upon completion of every memory block or chunk of the compressed image as in conventional techniques.

The DMA control system 10 implements a DMA channel 30 per each client 32 that has access to an image memory system, also referred to as the electronic precollation (EPC) memory 34. For example, such clients may be the C, M, Y, and K channels of a color scanning system, where each channel may have its own compression engine (not shown). The compression ratio and compressed image plane size are image data-dependent and thus non-deterministic. Each DMA channel 30 uses DMA chaining for block lists 36 assigned by memory block management software (MBMS) 38. Each DMA chain block 18 used generates an interrupt signal internal to the DMA channel 30 to which the block 18 is allocated, and each interrupt gets tallied by the internal block counter 16. Any DMA block 18 in the used block list 36 may also be programmed (e.g., via a DMA chaining block list command for that block) to mask or to transmit the internal interrupt out to the processor 20 if the associated block indicates a predetermined memory block threshold has been met or exceeded. It will be appreciated that many image DMA blocks need not transmit interrupts, in order to lessen real-time processing requirements of the system processor 20.

The block counter 16 can be cleared or preset before the DMA block allocation process begins and can be read after completion, where completion is indicated by an "end-of-compression" interrupt event. After completion, the value in the counter 16 is read by the memory block management software 38 and used by the processor 20 to index into the memory block list 36 assigned to the image. Blocks beyond the index in the list (e.g., not represented in the list) are then known to be unused and can be freed for use for subsequent compressed image storage. In this manner, no unused blocks are "owned" by or otherwise allocated to an image, and thus memory is used more efficiently as illustrated by the following example.

Using as an example, a typical color multifunction device architecture has scanning and image processing circuits (in copier mode) that produce C, M, Y, and K image planes at 600 PPI (pixels per inch) where each pixel 40 is stored in the EPC memory with an image bit and a tag bit. Thus an 11×17 inch page would produce the following data per image plane (uncompressed):

$$(11*17*600*600*2)/8=16.83 \text{ Mbytes}.$$

In this example, the DMA block size is typically set at 100 Kb (e.g., 102400 bytes). Therefore, each uncompressed plane uses 165 blocks. It is assumed for this example that image analysis software 42 has determined that each plane commonly compresses at least 10 to 1 and so each plane may need 17 blocks as default. Therefore, using a classical approach, 68 blocks minimum would be allocated to scan the four image planes. However, in an office environment, a subsequent image set may be quite different than the several previous image sets. For instance, if the subsequent scan image set has two pages and compresses to the following numbers of blocks:

Page 1:

| | |
|---|---|
| C | 8 |
| M | 5 |
| Y | 4 |
| K | 13 |

Page 2:

| | |
|---|---|
| C | 3 |
| M | 1 |
| Y | 5 |
| K | 4 | and if a default of 17 per plane is used, 136 total blocks will be used for the two pages under a classical approach. However, using the herein-described systems and methods, the actual numbers used will be known (by reading the block counters) after each scan/compression, and thus only 43 will be used for the above example and the remaining 93 blocks can be returned to the free or unused block list 44.

As previously mentioned, the MFD 12 comprises the processor 20 that executes, and memory 22 that stores, computer-executable instructions and/or computer-readable data for performing the various techniques and/or methods described herein. The memory 22 may be a computer-readable recording medium on which a control program is recorded, such as a disk, hard drive, or the like. Common forms of computer-readable media include, for example, floppy disks, flexible disks, hard disks, magnetic tape, or any other magnetic storage medium, CD-ROM, DVD, or any other optical medium, a ROM, a PROM, an EPROM, a FLASH-EPROM, or other memory chip or cartridge, or any other tangible medium from which a computer can read and use. Alternatively, the method may be implemented in a transmittable carrier wave in which the control program is embodied as a data signal using transmission media, such as acoustic or light waves, such as those generated during radio wave and infrared data communications, and the like.

Figure 2:
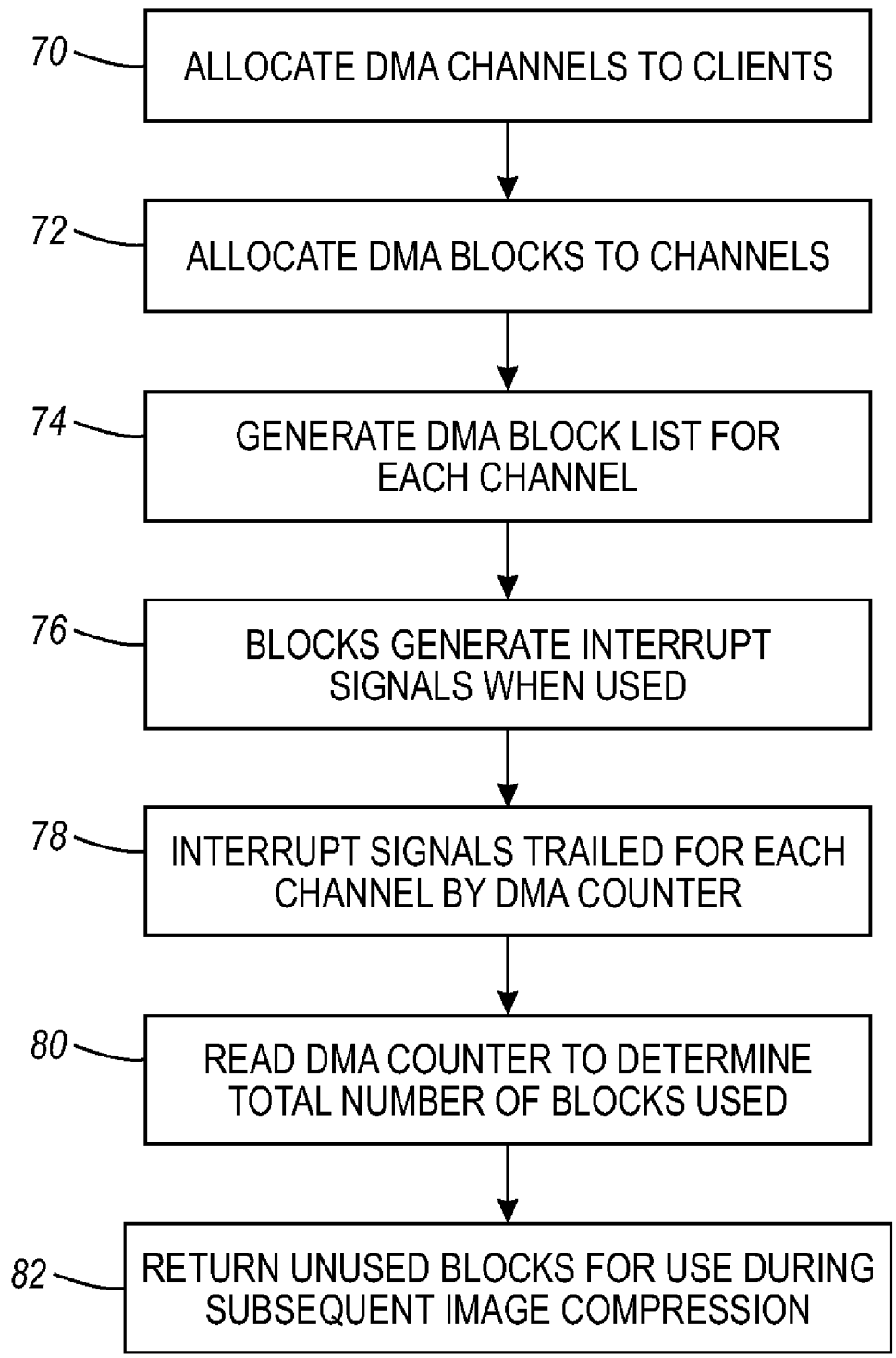
FIG. 2 illustrates a method of scalably assigning DMA blocks to DMA channels while returning unused blocks to a pool of available blocks in order to efficiently utilize DMA memory and reduce resource consumption by the DMA channels.

FIG. 2 illustrates a method of scalably assigning DMA blocks to DMA channels while returning unused blocks to a pool of available blocks in order to efficiently utilize DMA memory and reduce resource consumption by the DMA channels. At 70, a DMA channel is allocated to each client. At 72, DMA chaining is performed to allocate DMA blocks to each DMA channel (and thereby to each client). At 74, a DMA block list is generated for each DMA channel and comprises the identity of each block assigned to a given channel. At 76, each DMA block generates an interrupt signal that is internal to the DMA channel. Each interrupt signal is tallied by a DMA counter, at 78. When image compression is complete, the DMA counter is read (e.g., by a processor) to determine a total number of DMA blocks used by each DMA channel, at 80. At 82, blocks that have been made available but that are not included in the block list for any DMA channel are returned to an unused block list and are made available for subsequent use during image compression.

Figure 3:
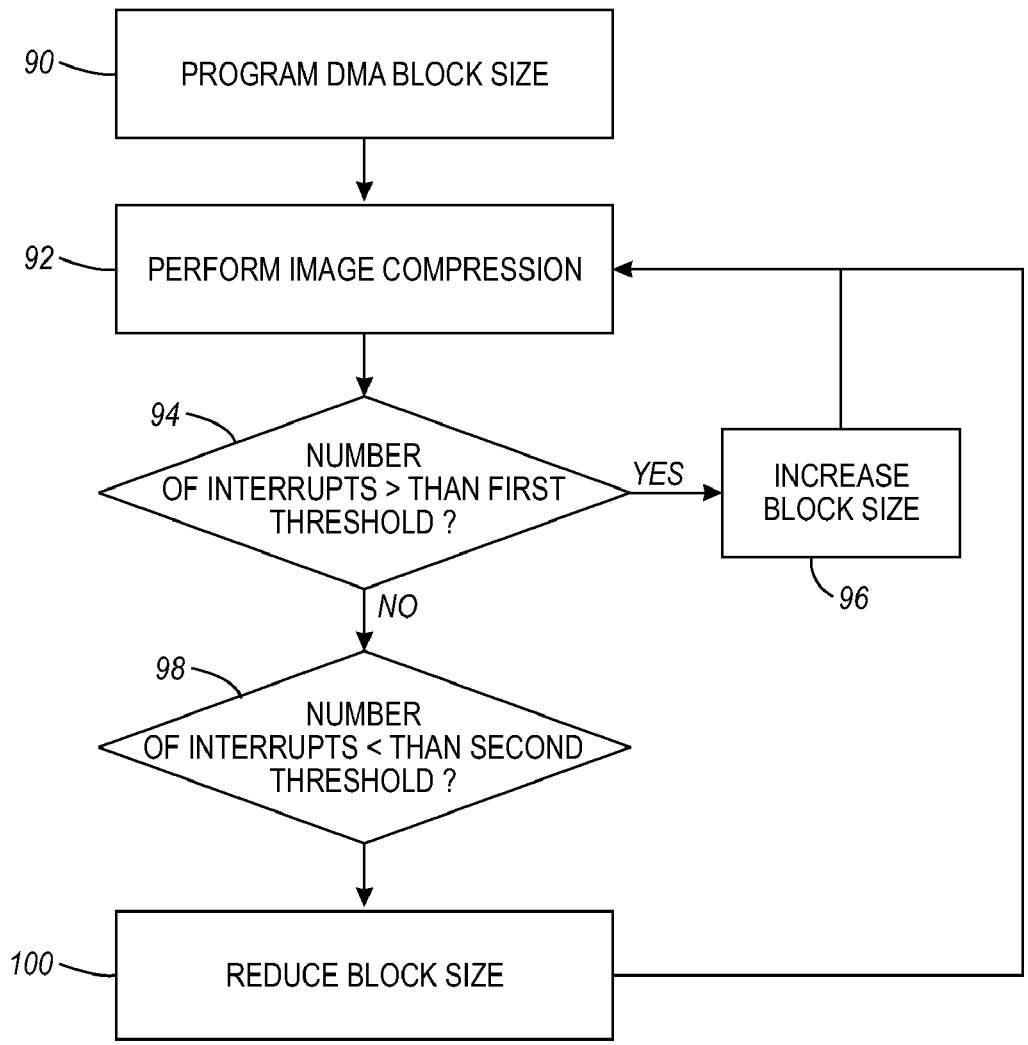
FIG. 3 illustrates a method for efficiently using DMA blocks during image compression, in accordance with one or more aspects described herein.

FIG. 3 illustrates a method for efficiently using DMA blocks during image compression, in accordance with one or more aspects described herein. At 90, DMA block size is programmed or preset by a user. Block size is selected as a function of block memory availability, image file size, number of images to be compressed and the like. Smaller blocks may require increased processing, while larger blacks result in greater waste, since a last allocated block for a given compressed image may not be wholly used. For instance, if a last allocated block is 200 kB and image compression only requires an additional 10 kB of DMA memory, then 190 kB of the block is wasted. However, if block size is preset to 50 kB, then only 40 kB will by unused. At 92, image compression is performed using DMA blocks of the predefined size.

At 94, a determination is made whether a number of interrupts being processed has exceeded a first predetermined threshold. If so, at 96, block size is increased to reduce the number of interrupts generated. The method then reverts to 92 for continued image compression using DMA blocks of the increased size. If the determination at 94 indicates that the number of interrupts being processed has not exceeded the first threshold, then at 98, a determination is made regarding whether the number of interrupts being processed is less than a second predetermined threshold, which is lower than the first predetermined threshold. If so, then block size is reduced to mitigate memory waste, at 100, and the method reverts to 92 for continued image compression and interrupt monitoring, using DMA blocks of the reduced size. If not, then the method reverts to 92 for continued monitoring of interrupt processing and image compression continues using the originally programmed block size.

Figure 4:
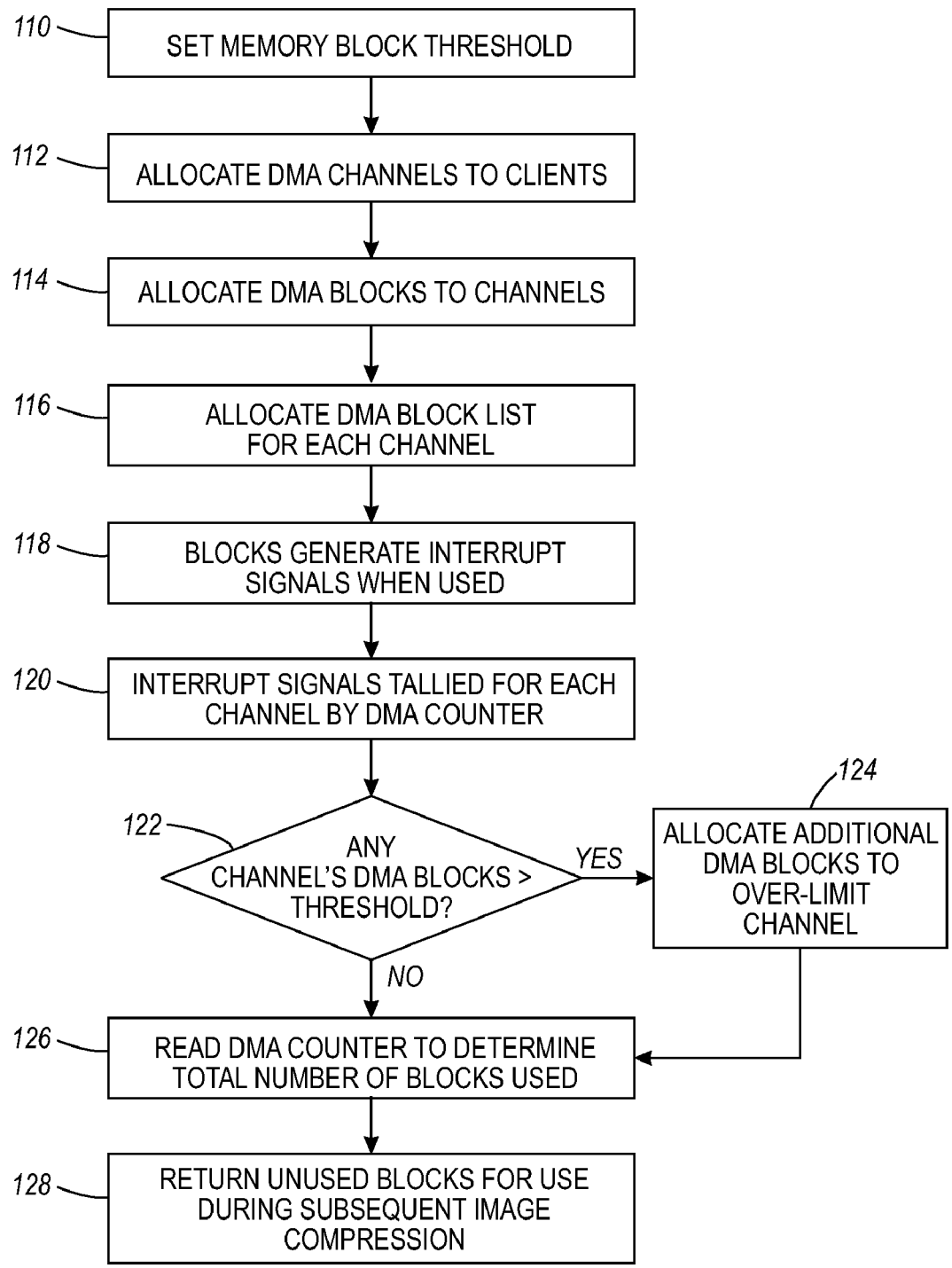
FIG. 4 illustrates a method of scalably assigning DMA blocks to DMA channels in a limited manner while increasing DMA memory usage efficiency, in accordance with one or more aspects described herein.

FIG. 4 illustrates a method of scalably assigning DMA blocks to DMA channels in a limited manner while increasing DMA memory usage efficiency, in accordance with one or more aspects described herein. At 110, a predetermined memory block threshold is set, which, when met, will trigger a pre-programmed memory block to generate an interrupt to signal that the DMA channel with which blocks are being assigned has met the threshold, and that more blocks should be made available. At 112, a DMA channel is allocated to each client. At 114, DMA chaining is performed to allocate DMA blocks to each DMA channel (and thereby to each client). At 116, a DMA block list is generated for each DMA channel and comprises the identity of each block assigned to a given channel. At 118, each DMA block generates an interrupt signal that is internal to the DMA channel. Each interrupt signal is tallied by a DMA counter, at 120. At 122, a determination is made regarding whether a given DMA channel has been allocated a number of DMA blocks equal to the predetermined memory block threshold. If so, then additional memory blocks are allocated from a stored list of free blocks to the given DMA channel, at 124. At 126, the DMA counter is read (e.g., by a processor) when image compression is complete to determine a total number of DMA blocks used by each DMA channel. At 128, blocks that have been made available but that are not included in the block list for any DMA channel are returned to an unused block list and are made available for subsequent use during image compression.

Optionally, any DMA block in the list for a given DMA channel can be programmed to generate and/or transmit an interrupt indicating that a predetermined memory block threshold has been met or exceeded by the DMA channel, upon receipt of which a processor or DMA controller channel component can allocate additional memory blocks from a stored list of free blocks to the DMA channel.

The methods illustrated in FIGS. 2-4 may be executed alone or in combination with each other, and may be implemented in a computer program product that may be executed on a computer (not shown) or computing device in the multifunctional device of FIG. 1, or coupled thereto. Further, it is to be appreciated that any suitable computing environment can be employed in accordance with the present embodiments. For example, computing architectures including, but not limited to, stand alone, multiprocessor, distributed, client/server, minicomputer, mainframe, supercomputer, digital and analog can be employed in accordance with the present embodiments.

The computer can include a processing unit such as the processor 20 of FIG. 1, a system memory such as the memory 22 of FIG. 1, and a system bus that couples various system components including the system memory to the processing unit. The processing unit can be any of various commercially available processors (e.g., a central processing unit, a graphical processing unit, etc.). Dual microprocessors and other multi-processor architectures also can be used as the processing unit.

The system bus can be any of several types of bus structure including a memory bus or memory controller, a peripheral bus, and a local bus using any of a variety of commercially available bus architectures. The computer memory includes read only memory (ROM) and random access memory (RAM). A basic input/output system (BIOS), containing the basic routines that help to transfer information between elements within the computer, such as during start-up, is stored in ROM.

The computer can further include a hard disk drive, a magnetic disk drive, e.g., to read from or write to a removable disk, and an optical disk drive, e.g., for reading a CD-ROM disk or to read from or write to other optical media. The computer typically includes at least some form of computer readable media. Computer readable media can be any available media that can be accessed by the computer. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other magnetic storage devices, or any other medium which can be used to store the desired information and which can be accessed by the computer.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above can also be included within the scope of computer readable media.

A number of program modules may be stored in the drives and RAM, including an operating system, one or more application programs, other program modules, and program non-interrupt data. The operating system in the computer can be any of a number of commercially available operating systems.

A user may enter commands and information into the computer through a keyboard (not shown) and a pointing device or stylus (not shown), such as a mouse. Other input devices (not shown) may include a microphone, an IR remote control, a joystick, a game pad, a satellite dish, a scanner, or the like. These and other input devices are often connected to the processing unit through a serial port interface (not shown) that is coupled to the system bus, but may be connected by other interfaces, such as a parallel port, a game port, a universal serial bus (USB), an IR interface, etc.

A monitor (not shown), or other type of display device, may also be connected to the system bus via an interface, such as a video adapter (not shown). In addition to the monitor, a computer typically includes other peripheral output devices (not shown), such as speakers, printers etc. The monitor can be employed with the computer to present data that is electronically received from one or more disparate sources. For example, the monitor can be an LCD, plasma, CRT, etc. type that presents data electronically. Alternatively or in addition, the monitor can display received data in a hard copy format such as a printer, facsimile, plotter etc. The monitor can present data in any color and can receive data from the computer via any wireless or hard wire protocol and/or standard.

The computer can operate in a networked environment using logical and/or physical connections to one or more remote computers, such as a remote computer(s). The remote computer(s) can be a workstation, a server computer, a router, a personal computer, microprocessor based entertainment appliance, a peer device or other common network node, and typically includes many or all of the elements described relative to the computer. The logical connections depicted include a local area network (LAN) and a wide area network (WAN). Such networking environments are commonplace in offices, enterprise-wide computer networks, intranets and the Internet.

When used in a LAN networking environment, the computer is connected to the local network through a network interface or adapter. When used in a WAN networking environment, the computer typically includes a modem, or is connected to a communications server on the LAN, or has other means for establishing communications over the WAN, such as the Internet. In a networked environment, program modules depicted relative to the computer, or portions thereof, may be stored in the remote memory storage device. It will be appreciated that network connections described herein are exemplary and other means of establishing a communications link between the computers may be used.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method of efficiently allocating digital image memory blocks, comprising:
    allocating a direct memory access (DMA) channel to each of one or more clients requiring memory allocation, wherein the clients are cyan (C), magenta (M), yellow (Y), and black (K) channels of a color scanning system;
    allocating one or more DMA blocks to each DMA channel;
    for each DMA channel, generating a DMA block list that identifies DMA blocks used by each DMA channel;
    generating an interrupt message from within each memory block as it is used by a DMA channel;
    determining whether a processor is processing a number of interrupt messages greater than a first predetermined threshold, wherein the processor processed an actual number of DMA blocks used by each DMA channel in a completed DMA chain multi-block transfer;
    increasing the size of the memory blocks being assigned to the DMA channels to reduce the number of interrupt messages generated in response to the number of interrupt messages exceeding the first predetermined threshold;
    determining whether the processor is processing a number of interrupt messages less than a second predetermined threshold, which is lower than the first predetermined threshold;
    decreasing the size of the memory blocks being assigned to the DMA channels to mitigate memory waste in response to the number of interrupt messages is less than the second predetermined threshold; and
    releasing unused allocated DMA blocks to a pool of available memory blocks not included in any DMA block list for subsequent use.

2. The method of claim 1, wherein generating the DMA block list comprises:
    internally generating the interrupt message by each DMA block once the DMA block is used by a DMA channel; and
    indexing a DMA block in the DMA block list for a given DMA channel upon detection of the interrupt message generated by the DMA block.

3. The method of claim 2, wherein determining the actual number of DMA blocks used by each DMA channel further comprises:
   counting the number of interrupt messages associated with each DMA channel.

4. The method of claim 2, wherein the DMA blocks have a predetermined initial size.

5. A system that facilitates efficient direct memory access (DMA) memory block allocation, comprising:
   a processor programmed to execute computer-executable instructions stored to a computer-readable medium, the instructions including:
   allocating a direct memory access (DMA) channel to each of one or more clients requiring memory allocation, wherein the clients are cyan (C), magenta (M), yellow (Y), and black (K) channels of a color scanning system;
   allocating one or more DMA blocks to each DMA channel;
   for each DMA channel, generating a DMA block list that identifies DMA blocks used by each DMA channel;
   generating an interrupt message from within each memory block as it is used by a DMA channel;
   determining whether a processor is processing a number of interrupt messages greater than a first predetermined threshold, wherein the processor processed an actual number of DMA blocks used by each DMA channel in a completed DMA chain multi-block transfer;
   increasing the size of the memory blocks being assigned to the DMA channels to reduce the number of interrupt messages generated in response to the number of interrupt messages exceeding the first predetermined threshold;
   determining whether the processor is processing a number of interrupt messages less than a second predetermined threshold, which is lower than the first predetermined threshold, wherein the processor processed an actual number of DMA blocks used by each DMA channel in a completed DMA chain multi-block transfer;
   decreasing the size of the memory blocks being assigned to the DMA channels to mitigate memory waste in response to the number of interrupt messages is less than the second predetermined threshold; and
   releasing unused allocated DMA blocks to a pool of available memory blocks not included in any DMA block list for subsequent use.

6. The system of claim 5, the instructions further comprising programming each DMA block to internally generate the interrupt message once the DMA block is used by a DMA channel, and indexing the DMA block in the DMA block list for a given DMA channel upon detecting the interrupt message generated by the DMA block.

7. The system of claim 6, the instructions further comprising counting the number of interrupt messages associated with each DMA channel to determine the actual number of DMA blocks used by each channel.

8. The system of claim 6, wherein the DMA blocks have a predetermined initial size.

9. A method of allocating memory blocks for image compression while mitigating processor overload, comprising:
   assigning direct memory access (DMA) memory blocks of a predetermined size to DMA channels respectively allocated to a plurality of clients, wherein the clients are cyan (C), magenta (M), yellow (Y), and black (K) channels of a color scanning system;
   generating an interrupt message from within each memory block as it is used by a DMA channel;
   determining whether a processor is processing a number of interrupt messages greater than a first predetermined threshold;
   increasing the size of the memory blocks being assigned to the DMA channels to reduce the number of interrupt messages generated in response to the number of interrupt messages is above the first predetermined threshold;
   determining whether the processor is processing a number of interrupt messages less than a second predetermined threshold, which is lower than the first predetermined threshold;
   decreasing the size of the memory blocks being assigned to the DMA channels to mitigate memory waste in response to the number of interrupt messages is below the second predetermined threshold; and
   returning unused assigned memory blocks to a pool of available memory blocks for use during a subsequent image compression procedure.

10. The method of claim 9, further comprising: receiving the interrupt message from within at least one of the assigned memory blocks indicating a block threshold has been met by the DMA channel to which the at least one memory block is associated therewith; and assigning, in response to the received interrupt message, at least one of the returned unused memory blocks from the pool of available memory blocks to the DMA.

* * * * *